US012737499B2

(12) United States Patent
Singh et al.

(10) Patent No.: US 12,737,499 B2
(45) Date of Patent: Sep. 15, 2026

(54) SELECTIVE ANONYMIZATION FOR USER DATA

(71) Applicant: SAP SE, Walldorf (DE)

(72) Inventors: Sudhakar Singh, Bengaluru (IN); Kshitij Rajesh Rao, Bengaluru (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/898,206

(22) Filed: Sep. 26, 2024

(65) Prior Publication Data

US 2026/0119709 A1 Apr. 30, 2026

(51) Int. Cl.

*G06F 21/62* (2013.01)
*G06F 21/60* (2013.01)
*G06F 40/186* (2020.01)
*H04W 12/02* (2009.01)
*H04L 9/40* (2022.01)
*H04W 12/03* (2021.01)

(52) U.S. Cl.

CPC ........ *G06F 21/6254* (2013.01); *G06F 21/602* (2013.01); *G06F 21/6245* (2013.01); *G06F 40/186* (2020.01); *H04W 12/02* (2013.01); *H04L 63/0407* (2013.01); *H04W 12/03* (2021.01)

(58) Field of Classification Search

CPC ................ G06F 21/62; G06F 21/6254; G06F 21/6245; G06F 21/602; G06F 40/205; G06F 40/186; H04L 63/04; H04L 63/0407; H04W 12/02; H04W 12/03

See application file for complete search history.

(56) References Cited

U.S. PATENT DOCUMENTS 10,963,590 B1 * 3/2021 Dash ................... G06F 21/6254
2014/0053244 A1 * 2/2014 Raman ................ G06F 21/6263 709/217
2019/0258824 A1 * 8/2019 Gkoulalas-Divanis ...................... G06F 21/6254
2021/0209251 A1 * 7/2021 Parthasarathy ....... G06F 21/602
(Continued)

OTHER PUBLICATIONS

GitHub—urchade/GLiNER: Generalist and Lightweight Model for Named Entity Recognition, NAACL 2024, 4 pages, printed Apr. 11, 2025 from https://github.com/urchade/GLiNER.
(Continued)

*Primary Examiner* — Shaqueal D Wade-Wright
(74) *Attorney, Agent, or Firm* — Sterne, Kessler, Goldstein & Fox P.L.L.C.

(57) ABSTRACT

Disclosed herein are system, method, and computer program product embodiments for selectively anonymizing user data. An embodiment operates by receiving the user data, wherein the user data comprises first data and a first prompt, and the first prompt indicates how to process the first data. The embodiment then receives an anonymization template, wherein the anonymization template specifies a profile to be anonymized in the user data and a tool used for anonymization. The embodiment then creates, based on the anonymization template, anonymized user data by anonymizing the profile in the user data using the tool specified in the anonymization template. The embodiment then input the anonymized user data to a first language model. The embodiment then receiving an anonymized response, wherein the anonymized response is a result of the first language model processing the anonymized user data.

20 Claims, 7 Drawing Sheets

(56) References Cited

U.S. PATENT DOCUMENTS

2025/0149031 A1* 5/2025 Jajodia .................... G10L 13/02
2025/0307465 A1* 10/2025 Fisher ................. G06F 21/6254

OTHER PUBLICATIONS

La Plateforme, Everything you need at the frontier, 15 pages. printed Apr. 11, 2025 from https://mistral.ai/products/la-plateforme.
Microsoft Azure, "Phi open model family, Redefining what's possible with SLMs," 6 pages, printed Mar. 24, 2025 from https://azure.microsoft.com/en-us/products/phi/.
Microsoft, "Presidio: Data Protection and De-identification SDK," 4 pages, printed Mar. 24, 2025 from https //microsoft.github.io/presidio/.
Ollama, "Get up and running with large language models," 1 page, printed Apr. 11, 2025 from https://ollama.com.
SpaCy—"spacy-stanza," 3 pages, printed Apr. 11, 2025 from https://spacy.io/universe/proiect/spacy-stanza.
SpaCy—"Trained Models & Pipelines," 9 pages, printed Apr. 11, 2025 from https://spacy.io/models.
Zaratiana, U., et al., "GLiNER: Generalist Model for Named Entity Recognition using Bidirectional Transformer," arXiv:2311.08526, 11 pages (Nov. 2023).

* cited by examiner

SELECTIVE ANONYMIZATION FOR USER DATA

BACKGROUND

In recent years, there has been an increase in demand for the use of language models, as typified by Large Language Models (LLMs), in business applications. At the same time, there is a technical issue of how to prevent LLMs from accessing sensitive data contained in business data. Additionally, there is the technical challenge of preventing LLMs from accessing sensitive business data while still preserving the context of the original business data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, and/or computer program product embodiments, and/or combinations and sub-combinations thereof, for selective anonymization.

Figure 1:
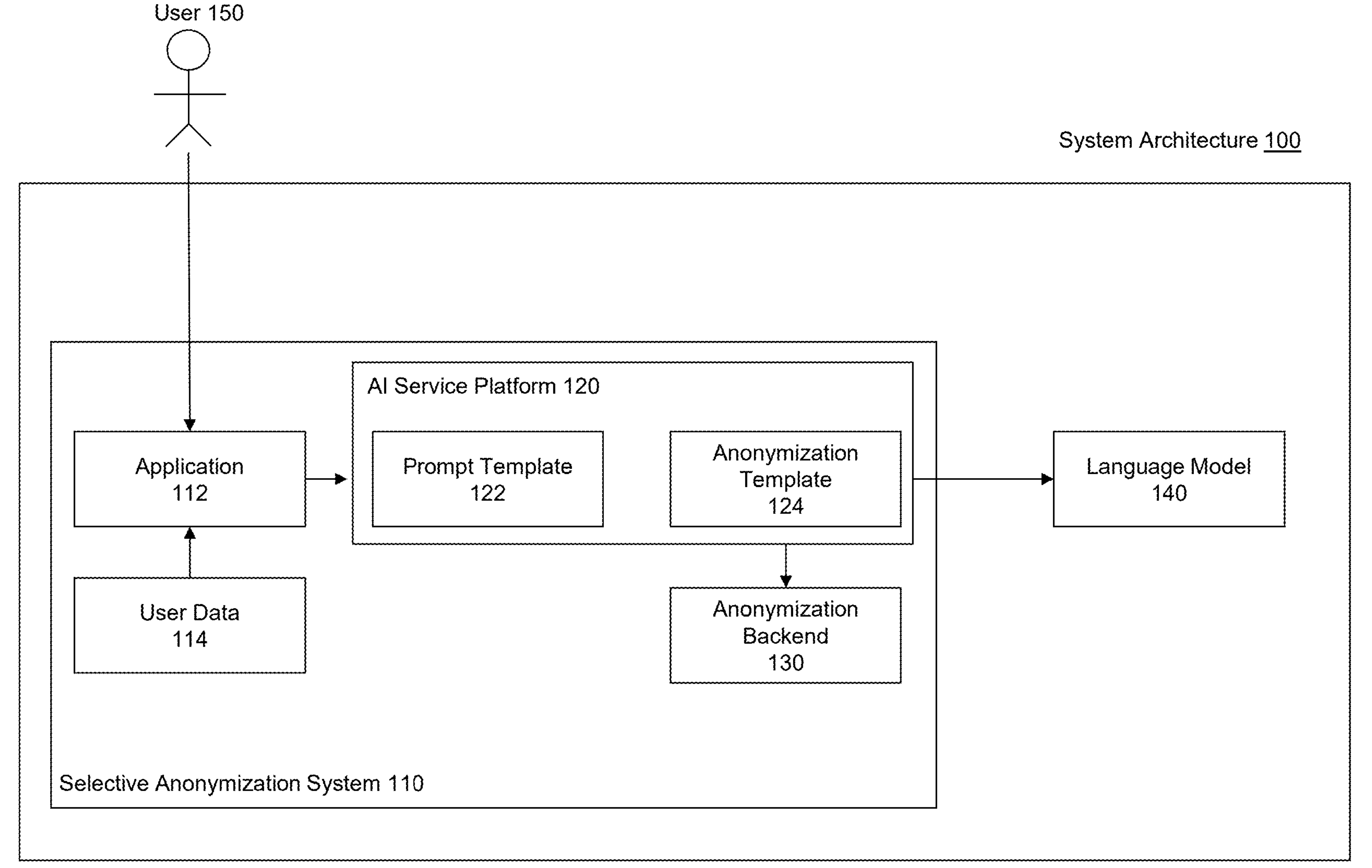
FIG. 1 is an architecture of a system for selective anonymization, according to some embodiments.

FIG. 1 is an architecture of a system for selective anonymization, according to some embodiments. System architecture 100 may include selective anonymization system 110 and language model 140. Selective anonymization system 110 may be a system provided for user 150. Selective anonymization system 110 may interact with user 150 and anonymize user data using language model 140.

Service anonymization system 110 may include application 112. Application 112 may provide a UI (User Interface) to user 150 and selectively anonymize data in cooperation with other data sources, microservices, and applications.

User data 114 may include first data (e.g., business data provided by user 150), and a first prompt indicates how to process the first data. User data 114 may contain PII (Personally Identifiable Information) or confidential data. Selective anonymization system 110 may selectively anonymize the PII and the confidential data while maintaining the context of the first data or first prompt in user data 114.

AI (Artificial Intelligence) service platform 120 may function as a hub that mediates the transfer of data between the AI, such as language model 140, within system architecture 100. Prompt template 122 may indicate that data provided to language model 140 is anonymized so that language model 140 can process the data properly.

Anonymization template 124 may specify a profile included in user data 114. The profile may be anonymized by selective anonymization system 110. The profile may be a name, an email address, a residence, an entity name, a phone number, a social security number, or any other PII or confidential information. Anonymization template 124 may also specify a tool used for the anonymization. The tool may be a model including an LLM or SLM (Small Language Model), or tools that do not use a language model (e.g., a rule-based anonymization tool).

Anonymization backend 130 may perform the processing required for selective anonymization in collaboration with language model 140. Details of anonymization backend 130 are described below.

As such, user data 114 provided by user 150 may be selectively anonymized by selective anonymization system 110 and processed appropriately by language model 140.

Figure 2:
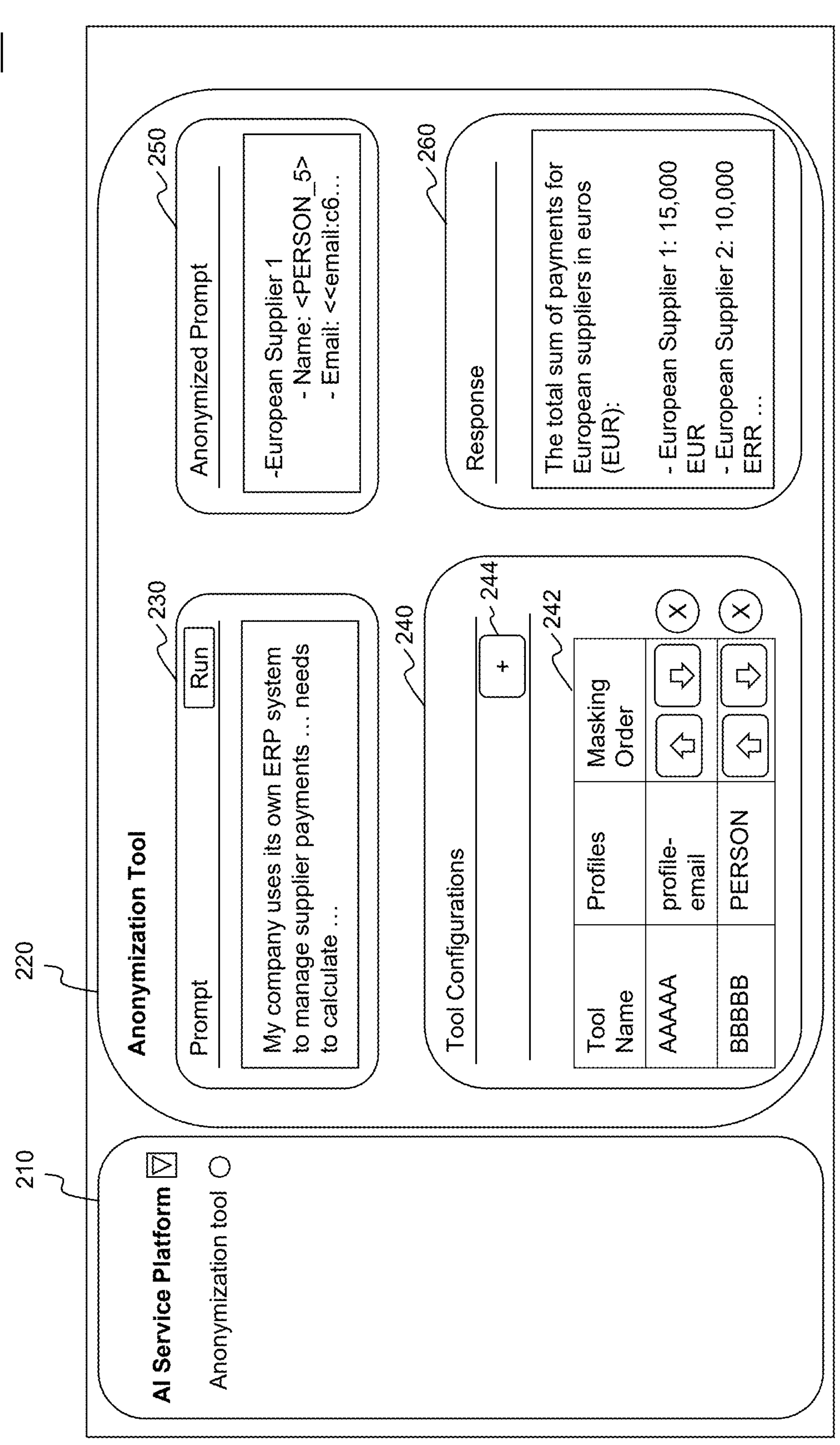
FIG. 2 is a UI (User Interface) of a system for selective anonymization, according to some embodiments.

FIG. 2 is a UI of a system for selective anonymization, according to some embodiments. User interface 200 may be a user interface of application 112. User interface 200 may display menu window 210 and tool window 220. Menu window 210 may show tools implemented in AI service platform 120. FIG. 2 shows the case where the anonymization tool performing the selective anonymization is selected by user 150.

Tool window 220 may display windows used for inputting and outputting the information for selective anonymization. Tool window 220 may include prompt window 230, tool configuration window 240, anonymized prompt window 250, and response window 260.

Prompt window 230 may receive the first prompt from user 150. As explained above, the first prompt may indicate how to process the first data. For example, the first prompt may include a following instruction to language model 140: "My company uses its own ERP system to manage supplier payments. The company deals with suppliers from both Europe and India, and it needs to make monthly payments to these suppliers in their respective currencies: euros (EUR) for European suppliers and rupees (INR) for Indian suppliers. The finance department at the company needs to calculate the total sum of payments in both currencies for budgeting and financial reporting purposes."

Prompt window 230 also may receive the first data from user 150. For example, the first data may include the following business data:

"Supplier Payments Data in ERP:
European Suppliers:
  European Supplier 1
    Name: John Smith
    Email: john.smith@eurosupplier.com
    Payment Amount: 15,000 EUR
  European Supplier 2
    Name: Maria Garcia
    Email: maria.garcia@eurosupplier.com
    Payment Amount: 10,000 EUR
  European Supplier 3
    Name: Andreas Müller
    Email: andreas.mueller@eurosupplier.com
    Payment Amount: 5,000 EUR
Indian Suppliers:
  Indian Supplier 1
    Name: Rajesh Patel
    Email: rajesh.patel@indiasupplier.com
    Payment Amount: 1,200,000 INR Indian Supplier 2
Name: Priya Singh
Email: priya.singh@indiasupplier.com
Payment Amount: 800,000 INR
Indian Supplier 3
Name: Sunil Kumar
Email: sunil.kumar@indiasupplier.com
Payment Amount: 500,000 INR"

User 150 can input the user data 114 into the selective anonymization system 110 in various other ways. For example, user 150 may also upload a file including the first prompt or the first data to selective anonymization system 110 directly. The first prompt may also specify how to receive the first data from other systems connected to selective anonymization system 110. In addition, the first prompt and the first data may not be clearly separated data, and the first data may be included in the first prompt.

Tool configuration window 240 may display anonymization template 124 via anonymization template table 242. As explained above, anonymization template 124 may specify the profile included in user data 114 and the tool used for the anonymization. For example, anonymization template table 242 indicates that a tool "AAAAA" is used for anonymizing a profile "profile-email" and then, a tool "BBBBB" is used for anonymizing a profile "PERSON." The order in which the tools are applied can be changed in the "masking order" table. User 150 may add a tool by pressing. How user 150 creates the anonymization template 124 is described below. By applying multiple tools to the profiles in a layer format as shown in tool configuration window 240, anonymization can be carried out by using the best tools for the selected profiles.

Anonymized prompt window 250 may display anonymized user data. As explained above, the profiles in user data 114 are anonymized by tools specified in anonymization template 124. Here, the first data includes suppliers' email addresses as the "profile-email" profile and suppliers' names as the "PERSON" profile. Then, the suppliers' emails are anonymized by the tool "AAAAA," and the suppliers' email addresses are anonymized by the tool "BBBBB." For example, the anonymized user data may include the following anonymized first data:

"Supplier Payments Data in ERP:
European Suppliers:
European Supplier 1
Name: <PERSON_5>
Email: <email>:3792a108-4fla-429a-b94f-3b2e4bafebb4
Payment Amount: 15,000 EUR
European Supplier 2
Name: <PERSON_4>
Email: <email>:38727696-9a4e-47ea-bdc3-7e3ca2adf6f1
Payment Amount: 10,000 EUR
European Supplier 3
Name: <PERSON_3>
Email: <email>:d0c23c68-8466-41a7-a535-ccd872f58eaf
Payment Amount: 5,000 EUR
Indian Suppliers:
Indian Supplier 1
Name: <PERSON_2>
Email: <email>:c197ce41-6953-4574-b150-b2d88892eba0
Payment Amount: 1,200,000 INR
Indian Supplier 2
Name: <PERSON_1>
Email: <email>:18003571-4cd7-4e5c-b7bbede2e0450b9e
Payment Amount: 800,000 INR
Indian Supplier 3
Name: <PERSON_0>
Email: <email>:2e38145d-5441-4bd2-8e47-05e08ded3398
Payment Amount: 500,000 INR"

As shown in the anonymized first data above, anonymizing the profile may be performed by replacing the profile with a tag structure using "< >." The tag structure may be useful as a clue to help language model 140 for determining which parts are anonymized. In the example above, the first prompt does not include the profile, but if the first prompt includes the profile, anonymization may be performed in the same way.

Response window 260 may display a de-anonymized response from language model 140. As explained above, language model 140 may process the anonymized user data. In the example above, language model 140 may process the anonymized first data shown above based on the instruction described in the first prompt shown above and prompt template 122.

As explained above, prompt template 122 may indicate that data provided to language model 140 is anonymized so that language model 140 can process the data properly. For example, prompt template 122 may include the following messages:

```
"messages = [
  {
    "role" : "system",
    "content" : """ You are a large language model. Understand and respond to
  the user's queries accurately. Any text wrapped within '<>' should be treated as
  masked personally identifiable information (PII) and should be maintained as it is in
  the response. Do not attempt to unmask or make assumptions about the information
  inside the tags. """
  },
  {
    "role" : "user",
    "content" : user-text
  }
]
```

As shown in the message above, the prompt may instruct language model 140 to maintain the tag structure in the anonymized response. In this way, the tag structure is maintained within the responses of language model 140, making a de-anonymization process described below easier.

The result of de-anonymized response of the language model 140 based on the anonymized first data, the instruction described in the first prompt, and prompt template 122 may be as follows:

"The total sum of payments to European suppliers in euros (EUR) is:

$$15{,}000 \text{ (European Supplier 1)} + 10{,}000 \text{ (European Supplier 2)} + 5{,}000 \text{ (European Supplier 3)} = 30{,}000\ EUR$$

The total sum of payments to Indian suppliers in rupees (INR) is:

$$1{,}200{,}000 \text{ (Indian Supplier 1)} + 800{,}000 \text{ (Indian Supplier 2)} + 500{,}000 \text{ (Indian Supplier 3)} = 2{,}500{,}000\ INR."$$

In this way, user 150 can selectively anonymize user data 114 on user interface 200 and have language model 140 process the anonymized user data.

Figure 3:
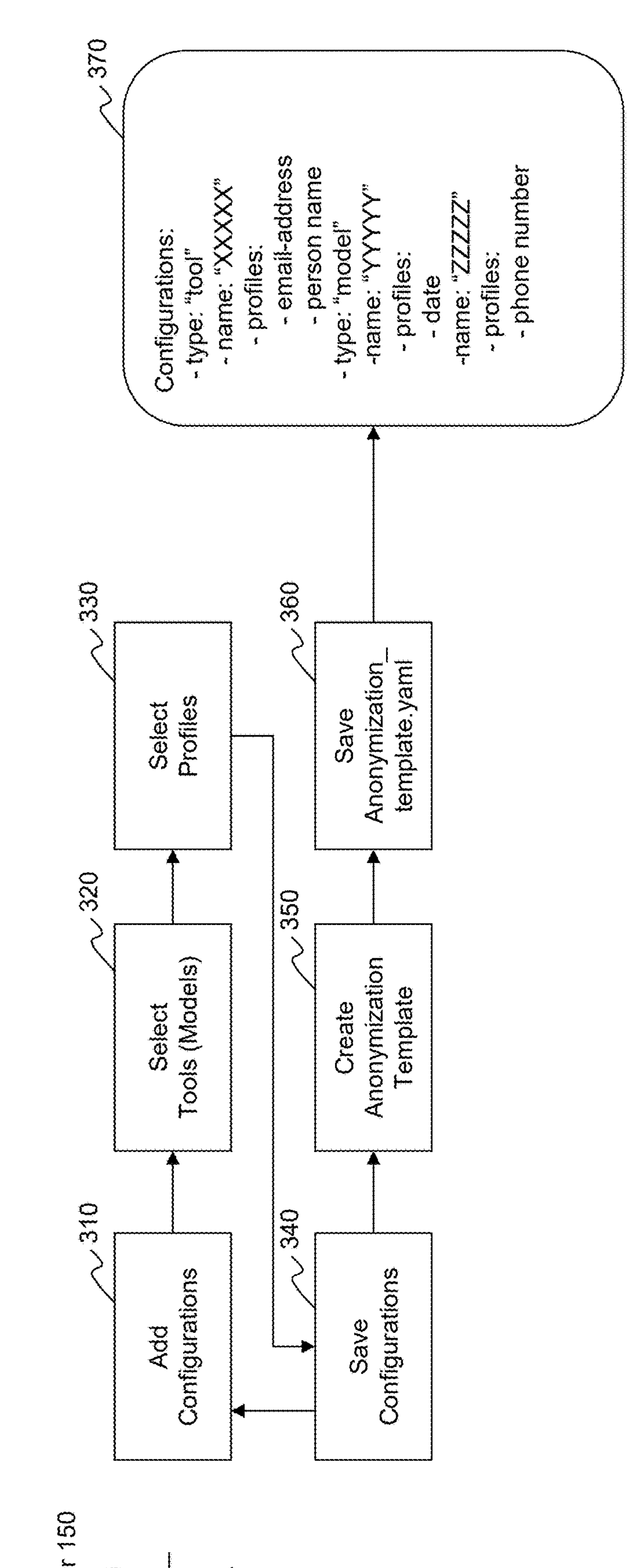
FIG. 3 is a flowchart for a method for creating an anonymization template, according to some embodiments.

FIG. 3 is a flowchart for a method 300 for creating an anonymization template, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1 and 2. However, method 300 is not limited to that example embodiment.

As explained above, selective anonymization system 110 can edit anonymization template 124 via user interface 200. Method 300 illustrates exemplary creation flow of anonymization template 124.

In 310, selective anonymization system 110 may receive a configuration which is a combination of the tool name and the profile. For example, user 150 can add the configuration by pressing add button 244.

In 320, selective anonymization system 110 may receive a selection of a tool for the anonymization. As explained above, the tool may be a model including an LLM or SLM, or tools that do not use a language model (e.g., a rule-based anonymization tool). The selection may include a predetermined profile or a custom profile.

In 330, selective anonymization system 110 may receive a selection of a profile to be anonymized by the tool. As explained above, the profile be a name, an email address, a residence, an entity name, a phone number, a social security number, or any other PII or confidential information.

In 340, selective anonymization system 110 may save the configuration. The saving operation may be performed via user interface 200. If selective anonymization system 110 proceeds to add the configuration further after saving the configuration, selective anonymization system 110 may repeat the process from operation 310.

In 350, selective anonymization system 110 may create anonymization template 124 based on the configuration.

In 360, selective anonymization system 110 may save anonymization template 124 as a ".yaml" file format. For example, anonymization template file 370 has the ".yaml" file format and indicates that the tool XXXXX (note that the term "tool" here is used to distinguish it from the term "model", which refers to a language model) is used to anonymize the profiles of "email address" and "person name", the tool "YYYYY" is used to anonymize the profile of "date", and the tool "ZZZZZ" is used to anonymize the profile of "phone number." The saving process may allow selective anonymization system 110 to create multiple anonymization templates and store the anonymization templates so that the anonymization template 124 can serve different use-case or scenarios.

Figure 4:
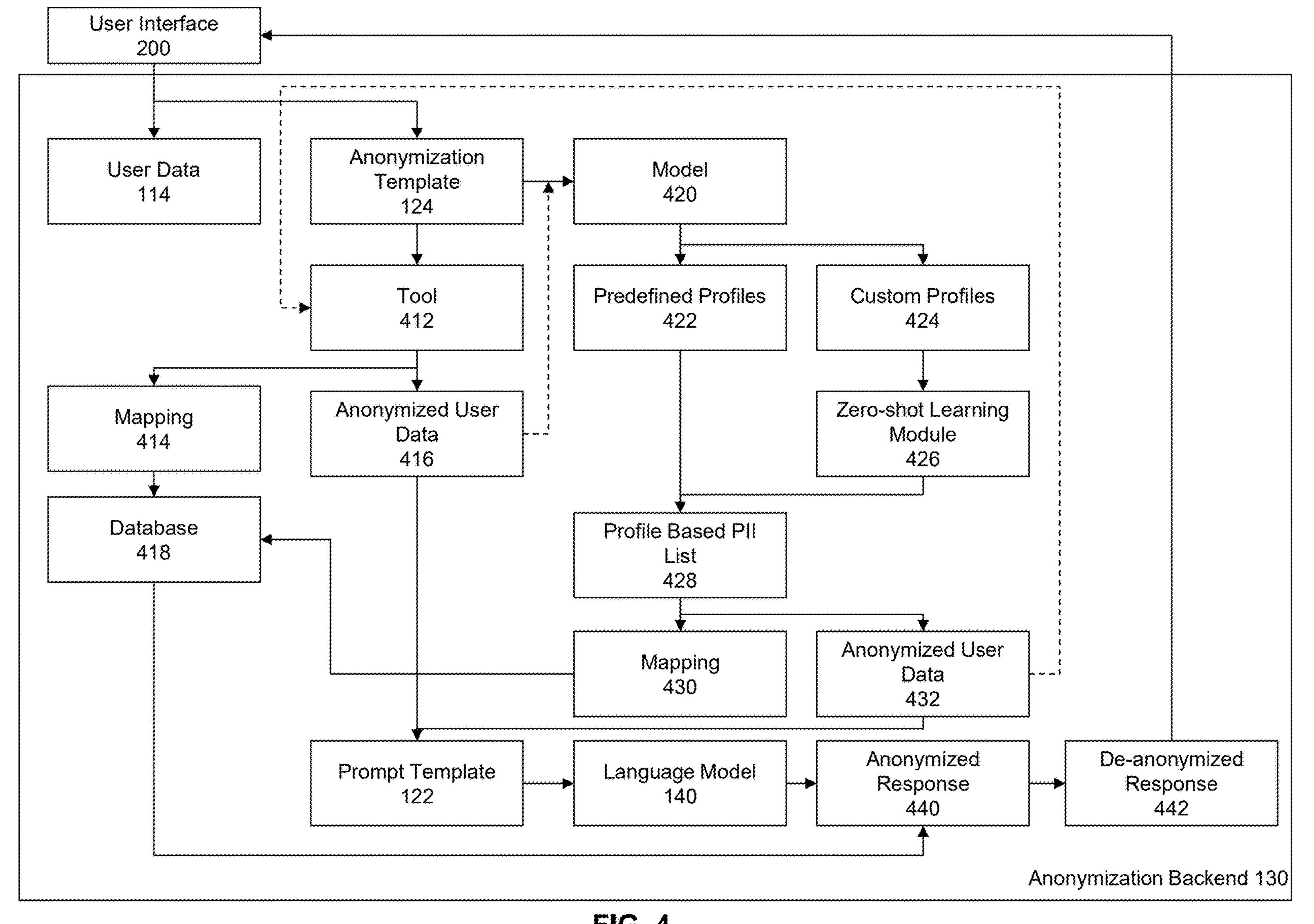
FIG. 4 is an architecture of an anonymization backend system, according to some embodiments.

FIG. 4 is an architecture of an anonymization backend, according to some embodiments. The processing flow explained above is explained from the perspective of architecture below, and some parts are explained in more detail.

Anonymization backend 130 may receive, via user interface, user data 114 and anonymization template 124. Anonymization template 124 may specify either a narrow-sense tool 412, which is a tool other than a language model, or a model 420, which is a language model as a tool.

Tool 412 may anonymize user data 114 or anonymized user data 432 which is anonymized by model 420. Tool 412 may create mapping 414 and anonymized user data 416. Mapping 414 may indicate a mapping between the anonymized profile and the tag structure. For example, mapping 414 may indicate that the "<PERSON_5>" in anonymized user data 416 corresponds to "John Smith" in user data 114. Mapping 414 may be saved in database 418. The tag structure may have <Profile name–n> structure where n is a number that will be used to distinguish different PII that fall under the same profiles.

Model 420 may anonymize user data 114 or further anonymize anonymized user data 416. If the profile specified in anonymization template 124 is predefined profile 422, model 420 may anonymize predefined profile 422 and create profile based PII list 428. Profile based PII list 428 may indicate a list of PII anonymized by model 420. Profile based PII list may be used for creating a mapping 430 and anonymized user data 432.

If the profile specified in anonymization template 124 is custom profile 424, zero-shot learning module 426 may perform a zero-shot learning to user data 114 to identify which profiles to be anonymized. After identifying the profile, model 420 may anonymize user data 114 or anonymized user data 416 and may create mapping 430 and anonymized user data 432. As such, zero-shot learning module 426 can simplify the process of adding new custom profiles.

Language model 140 may process anonymized first data in anonymized user data 416 or anonymized user data 432 according to anonymized first prompt in anonymized user data 416 or anonymized user data 432, and prompt template 122. Language model 140 may transmit anonymized response 440 as a result of the anonymization.

Anonymization backend 130 may de-anonymize the received anonymized response 440 and create de-anonymized response 442. Anonymization backend 130 may use mapping 414 or mapping 430 store in database 418 for the de-anonymization. For example, anonymization backend 130 may replace the anonymized profile with the profile (e.g., a name, an email address, a residence, an entity name, a phone number, a social security number, or any other PII or confidential information) by using the mapping between the anonymized profile and the tag structure. User interface 200 may display de-anonymized response 442 on response window 260.

Figure 5:
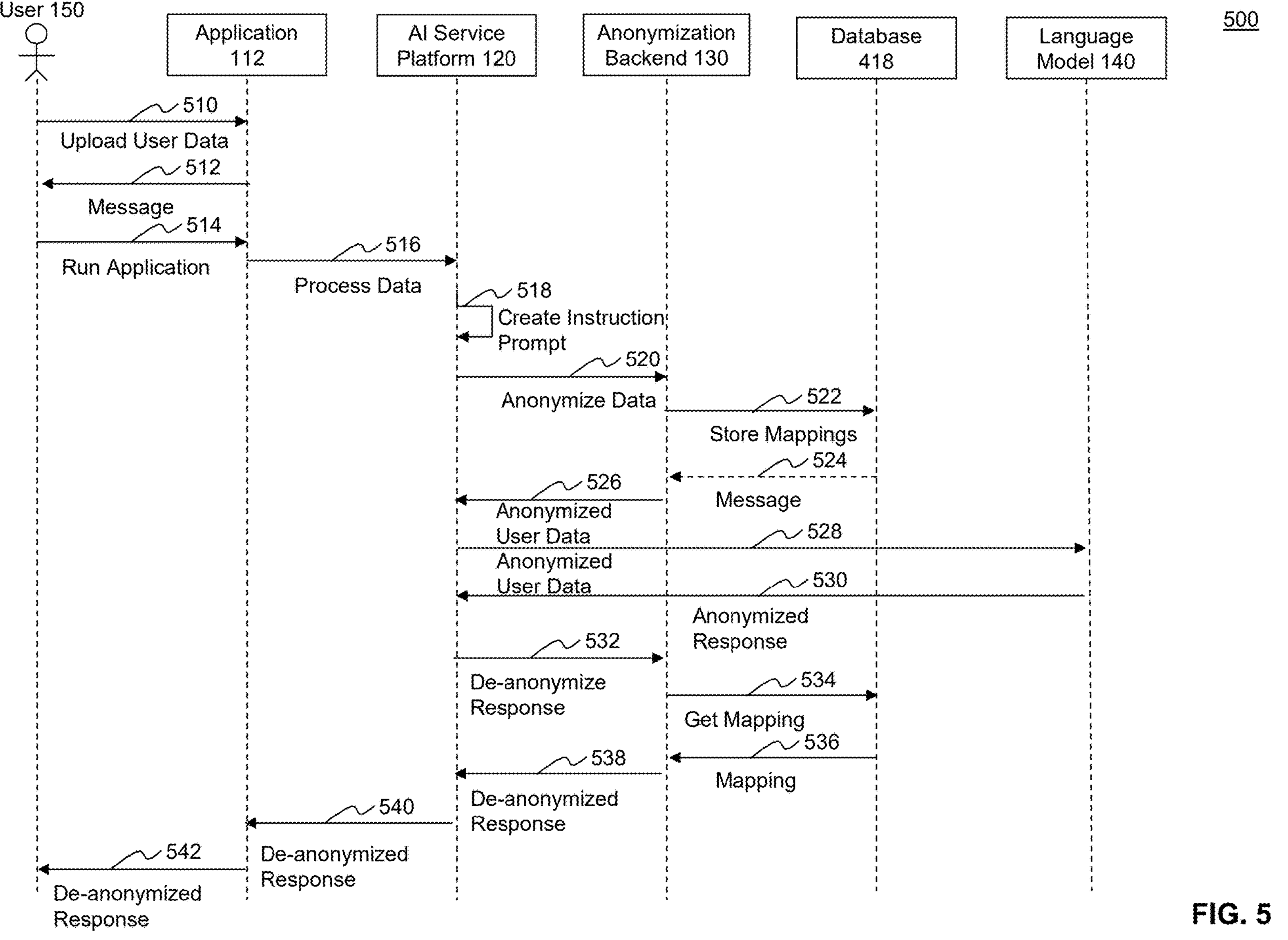
FIG. 5 is a workflow of a method for selective anonymization, according to some embodiments.

FIG. 5 is a workflow of a method 500 for selective anonymization, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIGS. 1-4. However, method 500 is not limited to that example embodiment.

In 510, selective anonymization system 110 may receive user data 114 to application 112. For example, selective anonymization system 110 may receive user data 114 via prompt window 230.

In 512, application 112 may transmit a message to user 150. For example, application 112 may transmit the message saying "user data uploaded successfully."

In 514, selective anonymization system 110 may run application 112. For example, selective anonymization system 110 may run application 112 in response to pressing the run button in prompt window 230.

In 516, application 112 may instruct AI service platform 120 to process data. For example, application 112 may transmit, to AI service platform 120, user data 114, an anonymization template id that specifies anonymization template 124, and prompt template id which specifies prompt template 122 with the instruction.

In 518, AI service platform 120 may create an instruction prompt. The instruction prompt may be created based on the first data and the first prompt in user data 114.

In 520, AI service platform 120 may instruct anonymization backend 130 to anonymize user data 114. For example, AI service platform 120 may transmit, to anonymization backend 130, the instruction prompt and anonymization template 124 with the instruction for anonymizing user data 114.

In 522, anonymization backend 130 may anonymize user data 114 and store mapping 414 or 430 to database 418. For example, anonymization backend 130 may store mapping 414 or 430 with an anonymization ID, which is a unique ID for the anonymization.

In 524, database 418 may transmit a message to anonymization backend 130. For example, database 418 may transmit a message saying "mapping stored successfully."

In 526, anonymization backend 130 may transmit anonymized user data 416 or 432 to AI service platform 120. For example, anonymization backend 130 may transmit anonymized user data 416 or 432 with the anonymization ID to AI service platform 120.

In 528, AI service platform may transmit anonymized user data 416 or 432 with prompt template 122 to language model 140.

In 530, language model 140 may transmit anonymized response 440 to AI service platform 120.

In 532, AI service platform 120 may instruct anonymization backend 130 to de-anonymize the received anonymized response 440. For example, AI service platform 120 may transmit anonymized response 440 with the anonymization ID to anonymization backend 130.

In 534, anonymization backend 130 may obtain mapping 414 or 430 from database 418 for the de-anonymization. For example, anonymization backend 130 may request mapping 414 or 430 with the anonymization ID.

In 536, database 418 may transmit mapping 414 or 430 to anonymization backend 130.

In 538, anonymization backend 130 may de-anonymize the received anonymized response 440 and transmit de-anonymized response 442 to AI service platform 120.

In 540, AI service platform 120 may transmit de-anonymized response 442 to application 112.

In 542, application 112 may display de-anonymized response 442 to user 150. For example, application 112 may display de-anonymized response 442 in response window 260.

As such, selective anonymization system 110 can selectively anonymize and retain user data 114's context. Thus, selective anonymization can ensure that anonymized user data 416 remains useful for being processed by language model 140.

Further, user 150 can have decision power over which profiles be anonymized using specific tools. Therefore, user 150 can keep some PII visible for processing by the language model 140 as needed.

In addition, once anonymization template 124 is created, it can be reused for similar use cases or scenarios. User 150 can also publish anonymization template 124 for other users to apply to their use cases or scenarios.

Figure 6:
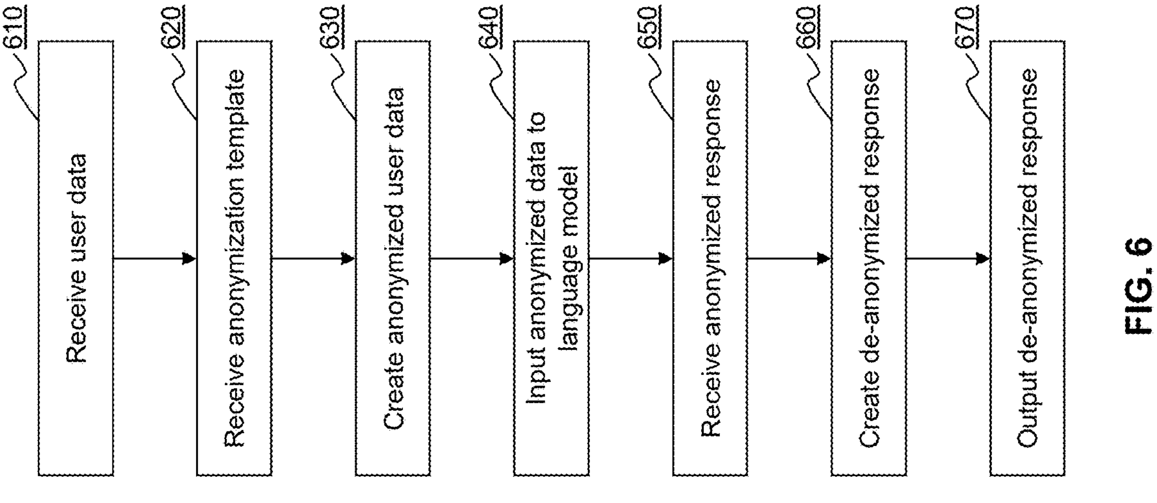
FIG. 6 is a flowchart for a method for selective anonymization, according to some embodiments.

FIG. 6 is a flowchart for a method 600 for selective anonymization, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIGS. 1-5. However, method 600 is not limited to that example embodiment.

In 610, selective anonymization system 110 may receive user data 114. User data 114 may include a first data and a first prompt, and the first prompt may indicate how to process the first data.

In 620, selective anonymization system 110 may receive anonymization template 124. Anonymization template 124 may specify a profile to be anonymized in the user data 114 and tool 412 used for anonymization.

In 630, selective anonymization system 110 may create anonymized user data 432. Anonymized user data 432 may be anonymized by anonymizing the profile in user data 114 using tool 412 specified in anonymization template 124.

In 640, selective anonymization system 110 may input anonymized user data 432 to language model 140.

In 650, selective anonymization system 110 may receive anonymized response 440. Anonymized response 440 is a result of language model 140 processing anonymized user data 432.

In 660, selective anonymization system 110 may create de-anonymized response 442.

In 670, selective anonymization system 110 may output de-anonymized response 442.

Figure 7:
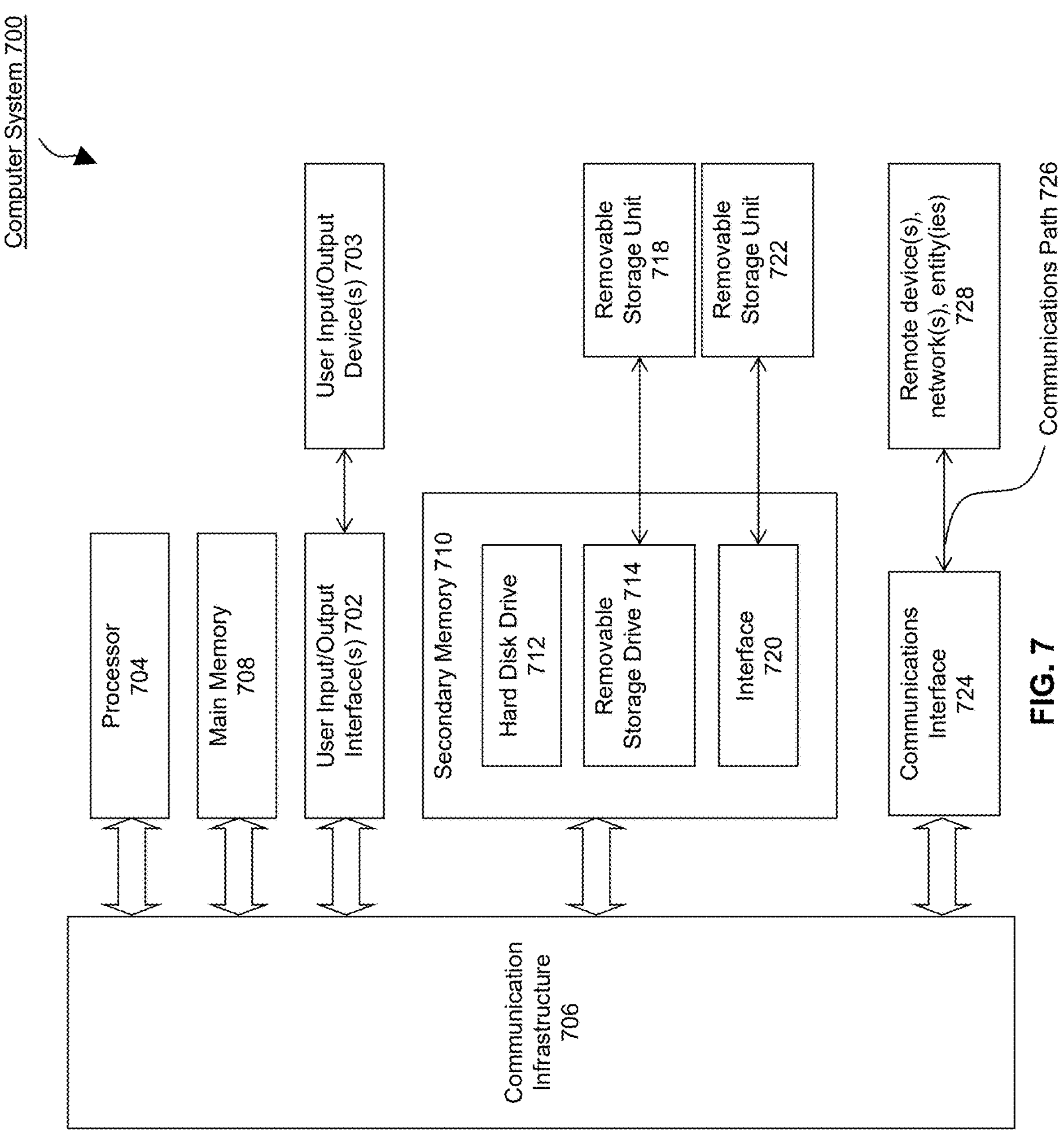
FIG. 7 is an example computer system useful for implementing various embodiments.

FIG. 7 is an example computer system useful for implementing various embodiments. Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). A GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for processing selectively anonymized user data, comprising:

receiving, by at least one processor, user data, wherein the user data comprises first data and a first prompt, and the first prompt indicates how to process the first data;

receiving an anonymization template, wherein the anonymization template specifies a profile to be anonymized in the user data and a tool for anonymizing the profile and wherein the profile specifies a type of confidential information within the user data to be anonymized;

creating, based on the anonymization template, anonymized user data by anonymizing the profile in the user data using the tool specified in the anonymization template, wherein the creating further comprises:

determining the first data corresponds to the type of confidential information; and based on the determining, generating the anonymized user data by modifying the first data using a tag structure corresponding to the tool, wherein the first data is replaced by a character format specified by the tag structure;

inputting the anonymized user data and the first prompt to a first language model, wherein the first language model evaluates the character format that replaced the first data;

receiving an anonymized response, wherein the anonymized response is a result of the first language model processing the anonymized user data and wherein the anonymized response maintains the tag structure;

creating a de-anonymized response by replacing the tag structure in the anonymized response with the first data; and outputting the de-anonymized response.

2. The computer-implemented method of claim 1, wherein the inputting the anonymized user data to the first language model comprises:

inputting a prompt template to the first language model, wherein the prompt template indicates that the anonymized user data is anonymized.

3. The computer-implemented method of claim 2, wherein the creating the anonymized user data comprises:

anonymizing the profile by replacing the profile with the tag structure, thereby creating an anonymized profile; and instructing, using the prompt template, the first language model to maintain the tag structure in the anonymized user data.

4. The computer-implemented method of claim 3, further comprising:

storing a mapping between the anonymized profile and the tag structure; and wherein the creating the de-anonymized response comprises replacing the tag structure in the anonymized response based on the stored mapping.

5. The computer-implemented method of claim 1, wherein the tool comprises a second language model, and the creating the anonymized user data comprises:

anonymizing the profile by anonymizing the profile in the user data using the second language model.

6. The computer-implemented method of claim 1, further comprising:

defining the profile in the user data by executing zero-shot learning to the user data.

7. The computer-implemented method of claim 1, wherein the type of confidential information specified by the profile comprises personally identifiable information.

8. A system for processing selectively anonymized user data, comprising:

a memory; and at least one processor coupled to the memory and configured to:

receive user data, wherein the user data comprises first data and a first prompt, and the first prompt indicates how to process the first data;

receive an anonymization template, wherein the anonymization template specifies a profile to be anonymized in the user data and a tool for anonymizing the profile and wherein the profile specifies a type of confidential information within the user data to be anonymized;

create, based on the anonymization template, anonymized user data by anonymizing the profile in the user data using the tool specified in the anonymization template, wherein the at least one processor is further configured to:

determine the first data corresponds to the type of confidential information; and based on the determination, generate the anonymized user data by modifying the first data using a tag structure corresponding to the tool, wherein the first data is replaced by a character format specified by the tag structure;

input the anonymized user data and the first prompt to a first language model, wherein the first language model evaluates the character format that replaced the first data;

receive an anonymized response, wherein the anonymized response is a result of the first language model processing the anonymized user data and wherein the anonymized response maintains the tag structure;

create a de-anonymized response by replacing the tag structure in the anonymized response with the first data; and output the de-anonymized response.

9. The system of claim 8, wherein to input the anonymized user data to the first language model, the at least one processor is configured to:

input a prompt template to the first language model, wherein the prompt template indicates that the anonymized user data is anonymized.

10. The system of claim 9, wherein to create the anonymized user data, the at least one processor is configured to:

anonymize the profile by replacing the profile with a tag structure, thereby creating an anonymized profile; and instruct, using the prompt template, the first language model to maintain the tag structure in the anonymized user data.

11. The system of claim 10, wherein the at least one processor is further configured to:

store a mapping between the anonymized profile and the tag structure; and wherein to create the de-anonymized response, the at least one processor is configured to replace the tag structure in the anonymized response based on the stored mapping.

12. The system of claim 8, wherein the tool comprises a second language model, and to create the anonymized user data, the at least one processor is configured to:

anonymize the profile by anonymizing the profile in the user data using the second language model.

13. The system of claim 8, wherein the at least one processor is further configured to:

define the profile in the user data by executing zero-shot learning to the user data.

14. The system of claim 8, wherein the type of confidential information specified by the profile comprises personally identifiable information.

15. A non-transitory computer-readable medium having instructions stored thereon that, when executed by at least one computing device, cause the at least one computing device to perform operations for processing selectively anonymized user data, the operations comprising:

receiving user data, wherein the user data comprises first data and a first prompt, and the first prompt indicates how to process the first data;

receiving an anonymization template, wherein the anonymization template specifies a profile to be anonymized in the user data and a tool for anonymizing the profile and wherein the profile specifies a type of confidential information within the user data to be anonymized;

creating, based on the anonymization template, anonymized user data by anonymizing the profile in the user data using the tool specified in the anonymization template, wherein the creating further comprises:

determining the first data corresponds to the type of confidential information; and based on the determining, generating the anonymized user data by modifying the first data using a tag structure corresponding to the tool, wherein the first data is replaced by a character format specified by the tag structure;

inputting the anonymized user data and the first prompt to a first language model, wherein the first language model evaluates a character format that replaced the first data;

receiving an anonymized response, wherein the anonymized response is a result of the first language model processing the anonymized user data and wherein the anonymized response maintains the tag structure;

creating a de-anonymized response by replacing the tag structure in the anonymized response with the first data; and outputting the de-anonymized response.

16. The non-transitory computer-readable medium of claim 15, wherein the inputting the anonymized user data to the first language model comprises:

inputting a prompt template to the first language model, wherein the prompt template indicates that the anonymized user data is anonymized.

17. The non-transitory computer-readable medium of claim 16, wherein the creating the anonymized user data comprises:

anonymizing the profile by replacing the profile with the tag structure, thereby creating an anonymized profile and instructing, using the prompt template, the first language model to maintain the tag structure in the anonymized user data.

18. The non-transitory computer-readable medium of claim 17, wherein the operations further comprise:

storing a mapping between the anonymized profile and the tag structure; and wherein the creating the de-anonymized response comprises replacing the tag structure in the anonymized response based on the stored mapping.

19. The non-transitory computer-readable medium of claim 15, wherein the tool comprises a second language model, and the creating the anonymized user data comprises:

anonymizing the profile by anonymizing the profile in the user data using the second language model.

20. The non-transitory computer-readable medium of claim 15, wherein the operations further comprise:

defining the profile in the user data by executing zero-shot learning to the user data.

* * * * *